(12) United States Patent
Donegan

(10) Patent No.: US 6,832,686 B2
(45) Date of Patent: Dec. 21, 2004

(54) CHILD RESISTANT COMPACT CASE

(76) Inventor: Michael Patrick Donegan, 313 Ipswich La., Williamstown, NJ (US) 08094

(*) Notice: Subject to any disclaimer, the term of this patent is extended or adjusted under 35 U.S.C. 154(b) by 0 days.

(21) Appl. No.: 10/100,947

(22) Filed: Mar. 19, 2002

(65) Prior Publication Data
US 2002/0185404 A1 Dec. 12, 2002

Related U.S. Application Data

(60) Provisional application No. 60/277,232, filed on Mar. 20, 2001.

(51) Int. Cl.[7] ............................................. B65D 83/04
(52) U.S. Cl. ...................... 206/531; 206/1.5; 220/326
(58) Field of Search ........................ 206/1.5, 528, 531, 206/534; 220/324, 326

(56) References Cited

U.S. PATENT DOCUMENTS

| 4,344,646 A | * | 8/1982 | Michel | 220/326 |
| 4,746,008 A | * | 5/1988 | Heverly et al. | 206/1.5 |
| 5,265,728 A | * | 11/1993 | Allendorf et al. | 206/531 |
| 5,267,668 A | * | 12/1993 | Jones | 220/326 |
| 5,346,069 A | * | 9/1994 | Intini | 206/531 |
| 5,645,167 A | * | 7/1997 | Conrad | 206/1.5 |
| 6,021,901 A | * | 2/2000 | Wolfe | 206/531 |
| 6,338,408 B1 | * | 1/2002 | Anderson | 206/531 |

* cited by examiner

Primary Examiner—Luan K. Bui
(74) Attorney, Agent, or Firm—Eugene E. Renz, Jr. P.C.

(57) ABSTRACT

A package for medicaments comprising a cover and a base connected along one edge by a living hinge, at least two spaced pivotable latching members on one of the members, complementary openings in the other member engagable by the latching member to secure the cover in a closed position, pivoting of one of said latching members to release it from its opening part permitting slight pivotable movement of the cover toward an open position.

3 Claims, 9 Drawing Sheets

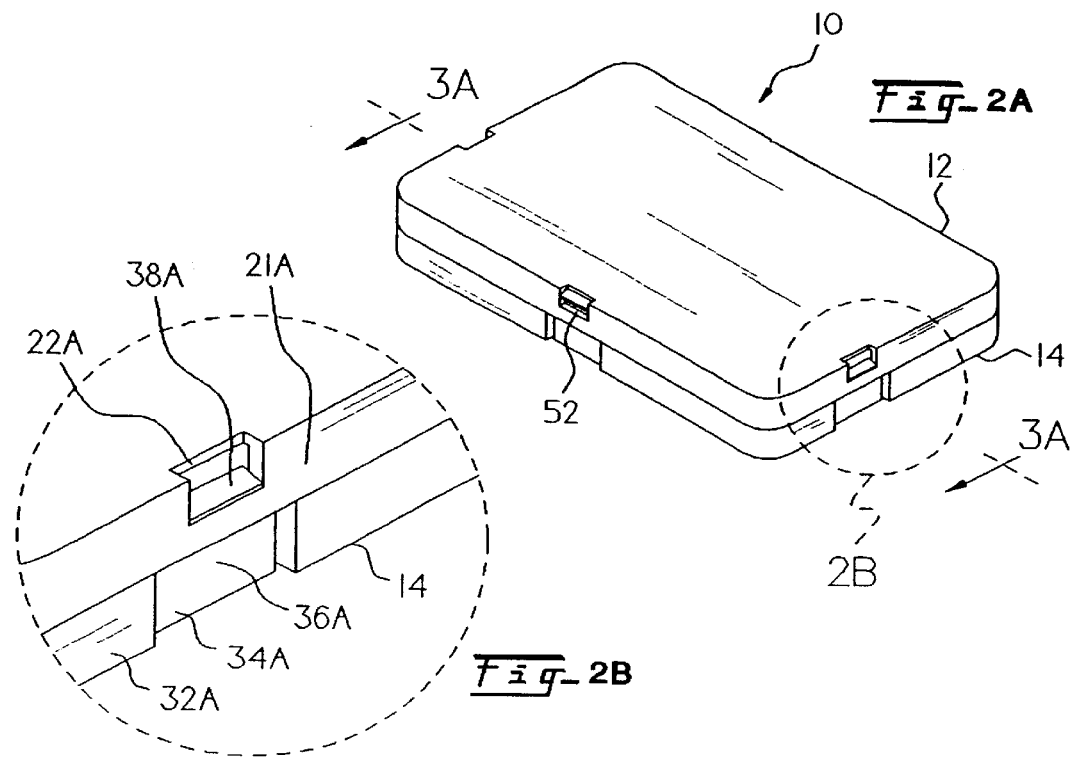
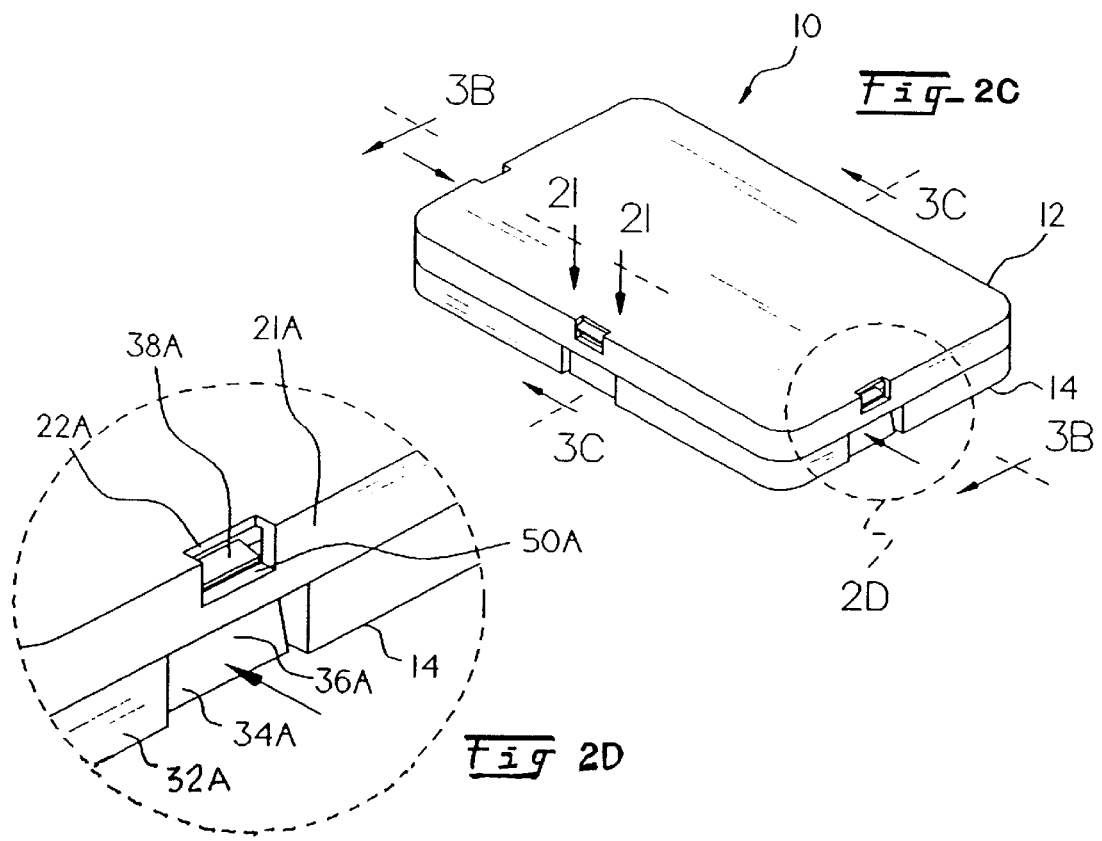

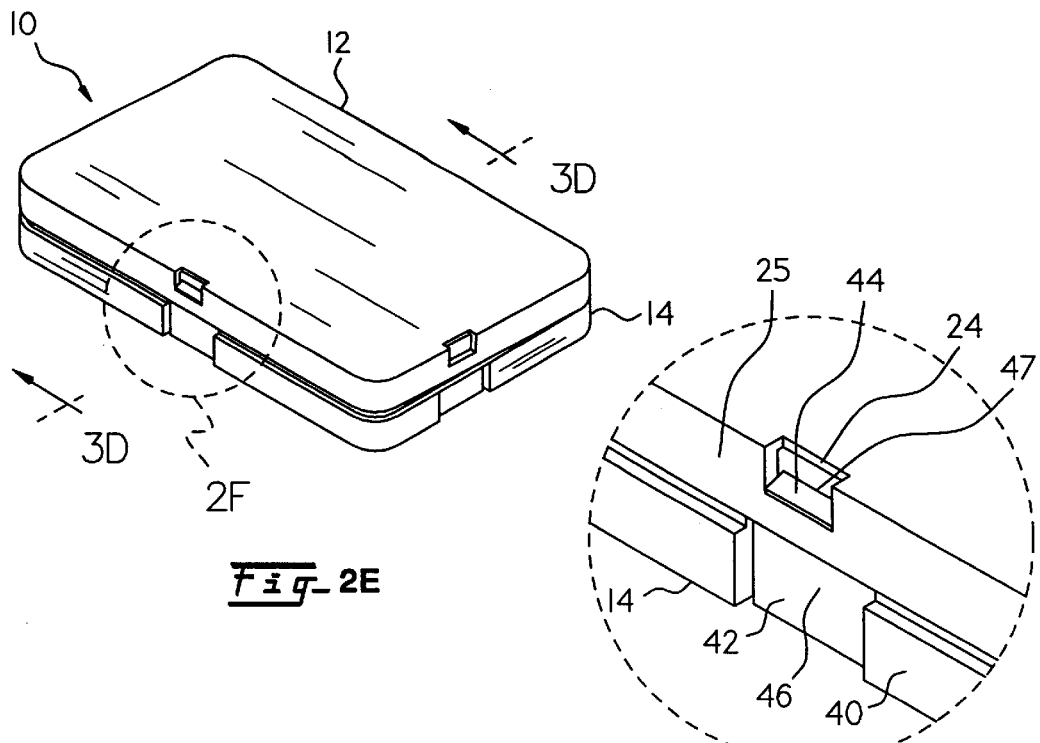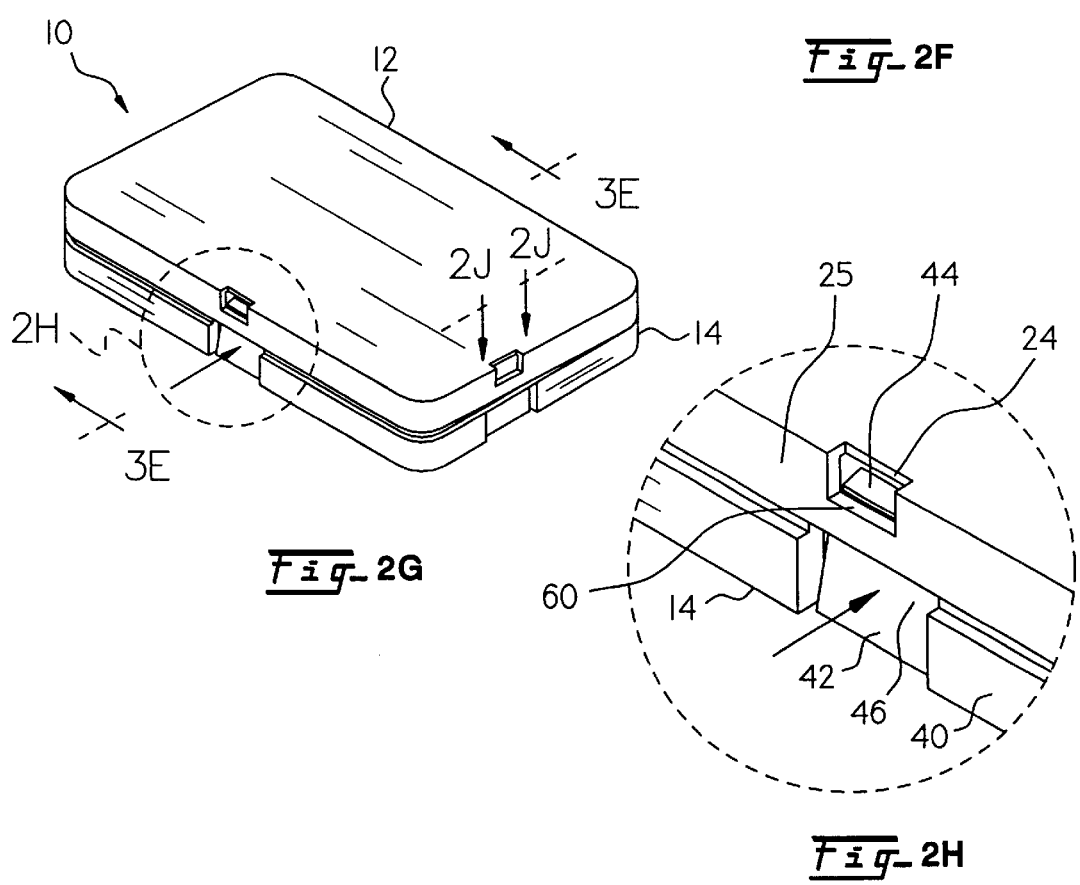

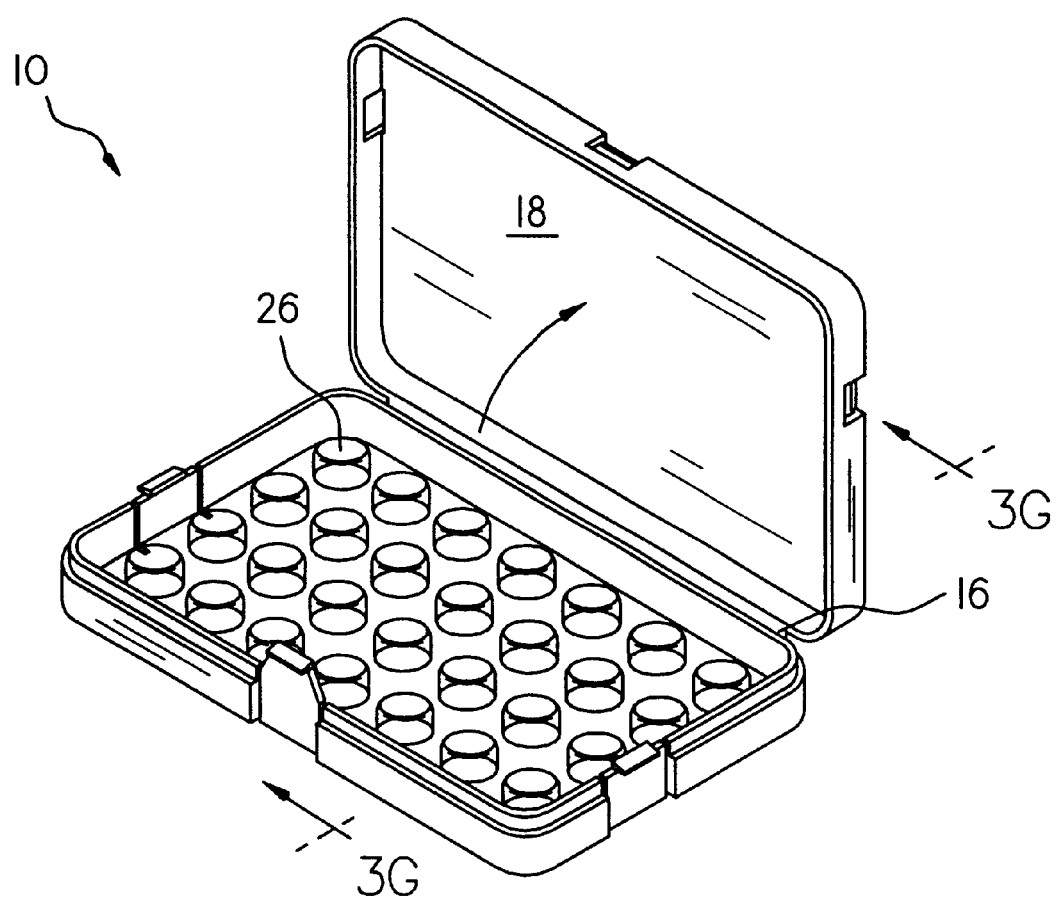
Fig_2K

CHILD RESISTANT COMPACT CASE

This application claims the benefit of U.S. Provisional Application No. 60/277,232 filed Mar. 20, 2001.

FIELD OF THE INVENTION

The present invention relates to packages for dispensing medicaments in pill form. More specifically, the invention relates to a novel child resistant compact case for sorting and dispensing pills in blister packs.

BACKGROUND OF THE INVENTION

The blister packs in which medicaments in pill form are housed usually consists of a plurality of pockets wherein each pocket has a frangible wall so that the pills can be dispensed through the package by pushing them against the frangible wall. The blister pack is usually housed in an outer package or case having a discharge opening through which the pills can be dispensed one at a time. Some of these package arrangements are provided with some sort of locking mechanism to limit access to the package and particularly children. It has been found that these prior systems are either cumbersome or are not truly child resistant or child tamper proof.

SUMMARY OF THE INVENTION

With the foregoing in mind, it is an object of the present invention to provide a package or case for medicaments which is of relatively simple design and is easy and economical to manufacture and is truly child resistant. To this end, in accordance with the present invention, the case or package comprises a cover and a base which may be made of a plastic material and which are connected to one another along a living hinge which normally biases the cover to an open position. In the present instance, the base has a series of openings corresponding with and of the same configuration or array as the pills in a blister pack so that the pills of the blister pack overlie an opening in the base. In this manner when the cover is open, a user can dispense one pill at a time by simply pressing on the pocket of the pill and displacing it through the opening in the base and in the process fracturing the frangible wall of the blister pack.

In the present instance, the cover and base are of generally rectangular shape wherein the cover and base are pivotally connected by the living hinge along one longitudinal back edge. Means is provided for locking the cover to the base in a closed position which is truly child resistant. To this end pivotal latching members are formed in the opposing side or end walls of the base having lips with a beveled or tapered top face. A latching member is also provided in the front wall of the base. The lips of the end wall latching members are aligned with and engagable through openings in the cover so that when the cover is in the closed position, the lip seats on the edge of the opening in the cover so that the latching lips on opposing ends snugly embraces the edge of the opening in the cover and the latching lip on the front wall is slightly spaced upwardly from the edge of the opening in the cover along the front edge.

Accordingly, by this construction, when an adult user desires to open the cover to access the blister pill pack and dispense a pill, the end latching members are pressed inwardly which pivots the lip out of engagement with the edge in the opening of the cover whereby the living hinge pivots the cover upwardly until the lip on the front edge engages the edge of the opening in the front edge of the cover. The front latching member must be pressed in to release the lip and pivot the cover to a full open position in order to access the pill medicaments. Accordingly, it is clear that the latching arrangement of the present invention is truly child resistant because of the complex maneuvers required to fully open the cover. For example, the end latching members require simultaneous activation and are often spaced apart a distance so they can't be bridged by the small hand of a child. Further, even if the end latches are activated, it also requires the solving of the front edge latch.

BRIEF DESCRIPTION OF THE DRAWINGS

These and other objects of the present invention and various features and details of the operation and construction thereof are hereinafter more fully set forth with reference to the accompanying drawings, wherein:

FIG. 2A is a perspective view of the child resistant compact case closed.

FIG. 2B is an enlarged, fragmentary view of the locking mechanism or latch shown in broken lines in FIG. 2A.

FIG. 2C is a perspective view similar to FIG. 2A with the latches partially activated.

FIG. 2D is a fragmentary view of the portion circled in dotted lines in FIG. 2C.

FIG. 2E is a perspective view showing the halves of the child resistant compact case with the upper latches fully pressed inwardly or activated which permits limited separation of the halves of the case by reason of the living hinge connecting the two halves.

FIG. 2F is an enlarged fragmentary view showing the circular portion in broken lines in FIG. 2E.

FIG. 2G is a perspective view showing the case in a partially open position, where the primary side latches are disengaged and the secondary latch is being dispensed.

FIG. 2H is an enlarged fragmentary view of the portions in circular broken lines in FIG. 2G.

FIG. 2K is a view showing the case in a fully open position.

DETAILED DESCRIPTION OF THE PREFERRED EMBODIMENTS

Figure 1A:
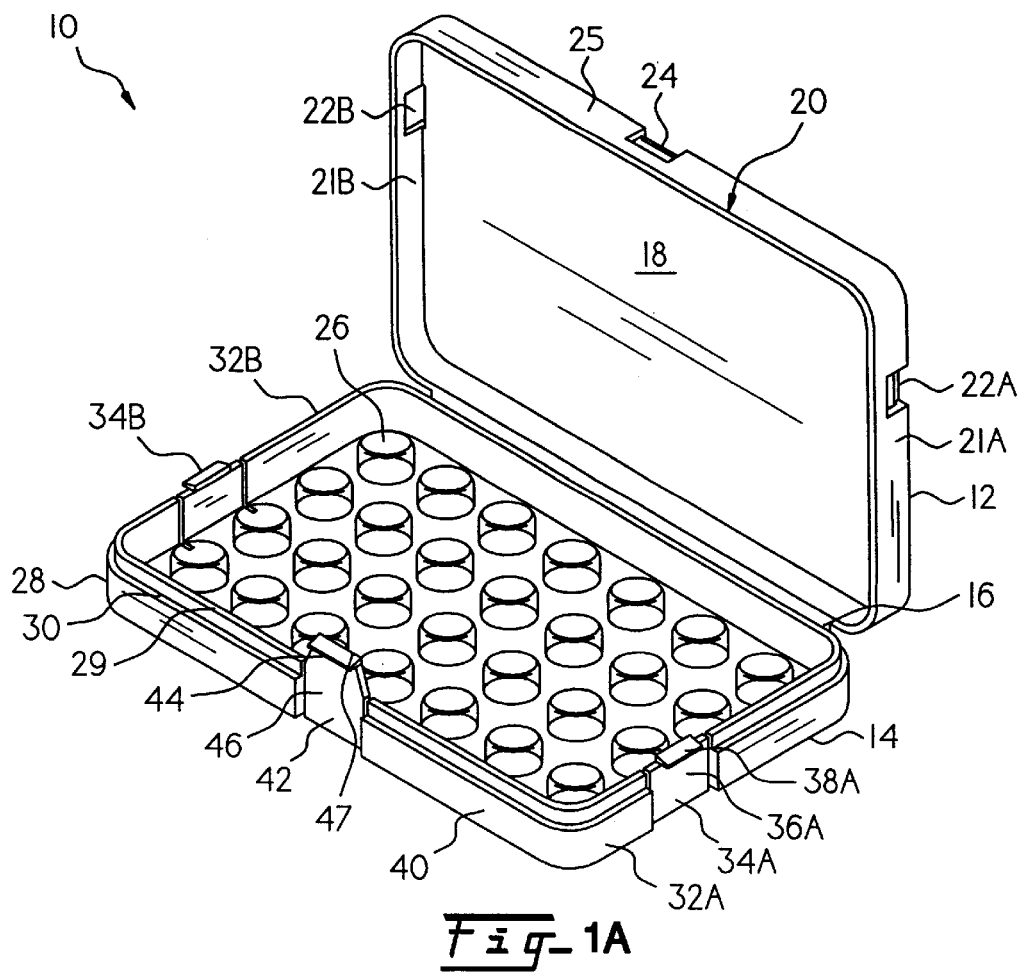
FIG. 1A is a perspective view of a first embodiment of a child resistant compact case for pill medicaments, in accordance with the present invention, in an open position wherein pills can be dispensed by the user.
Figure 1B:
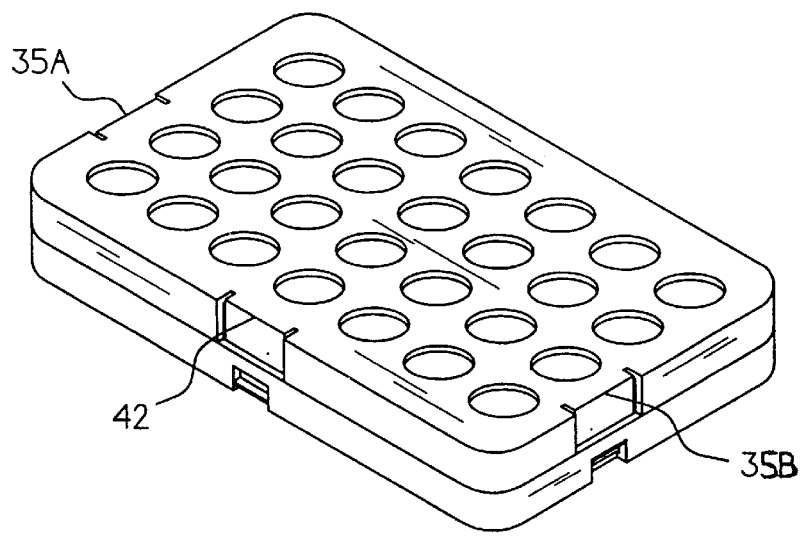
FIG. 1B is a perspective view of the child resistant compact case in the closed position with the bottom facing up.

Referring now to the drawings and particularly to FIGS. 1A and 1B thereof, there is shown a child resistant compact case for pill medicaments in accordance with the present invention, generally designated by the numeral 10. The case as illustrated, comprises a generally rectangular cover (12) and a generally rectangular base (14) connected along one longitudinal edge by a living hinge (16). The cover has a top panel (18) and a depending peripheral skirt (20). Slot (24) is provided in the front skirt portion (25) and aligned slots (22A and 22B) are provided in the opposing side skirt portions (21A and 21B). The base (14) as shown has a plurality of packets (26) arranged in rows which house the pill-like medicaments. The base (14) is provided with a series of openings (14a) arranged in rows to align with the pill pack so that pills can be dispensed from desired simply by pressing the top of a packet downwardly which fractures the frangible cover (14b) and permits discharge of the pill through the opening (14a). The base (14) has an upstanding, peripherally extending sidewall (28) which is offset inwardly to define a peripherally extending ledge (30) within which the skirt (20) of the top nests in the manner shown in FIG. 1B and in the other views showing the case in a closed position. The opposing sidewalls (32A and 32B) of the base (14) have longitudinal aligned opposing latches or lock members (34A and 34B) comprising an upstanding pad portion (36A) of generally rectangular form aligned with the sidewall (32A) of the base (14) and hinged at its lower edge as at 35A to permit flexing inward displacement in a manner to be described hereafter. A blister pack (26) fits into case and aligns with holes in the base (14). The lips (38a, 38b and 44) as shown have a downwardly inclined or beveled top surface or face so that when the cover is pivoted downwardly from its open position to a closed position, the lower terminal edge of the side and front skirt portions of the cover engage the latching members and pivot them inwardly until the cover is fully closed whereby the latching members pivot outwardly again when the lips of the latching members engage in their respective openings in the cover.

The secondary latching member (42) includes an outwardly projecting lip (44) formed integrally with the top edge (47) of the pad (46). The primary side latching members (34A and 34B) are aligned with the side slots (22A and 22B) in the cover (12) so that when the cover (12) is in a closed position, the lips (38A and 38B) engage a bottom edge (50A and 50B) of the slot (22A and 22B) to lock the cover (12) in a closed position on the base (14).

In the present instance, the bottom faces (33A and 33B) of the lips (38A and 38B) lie in a plane P—P, which also includes the top edge (29) of the sidewall (28) of the base (14). In the principal embodiment, there is a third locking or latching member (42) in the front wall (40) of the base (14), which likewise is hinged along the bottom edge of the base as at 45. The front secondary lock or latch (42) includes a lip (44) which projects outwardly from the top edge of the pad (46). In the present instance, the lower face (43) of the lip (44) lies in the plane A—A above the plane P—P of the top edge (29) of the base (14) for a purpose to be described hereinafter.

Figure 2I:
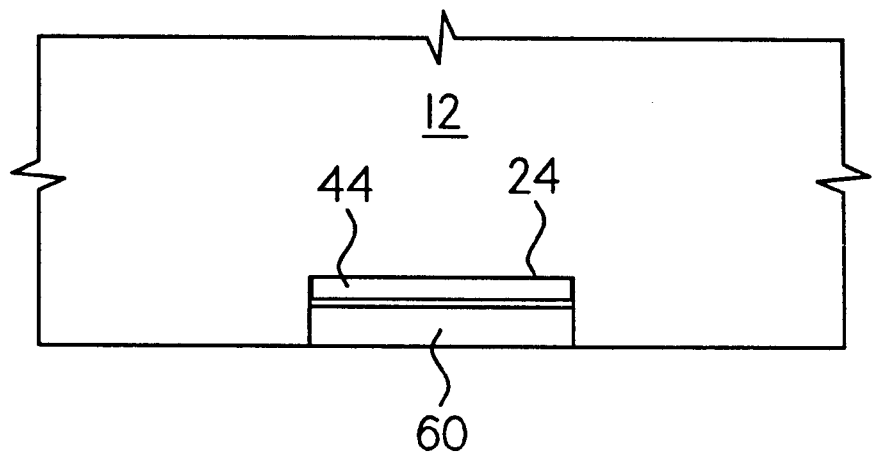
FIG. 2I is an enlarged fragmentary top plan view taken along lines 2I—2I of FIG. 2C.
Figure 2J:
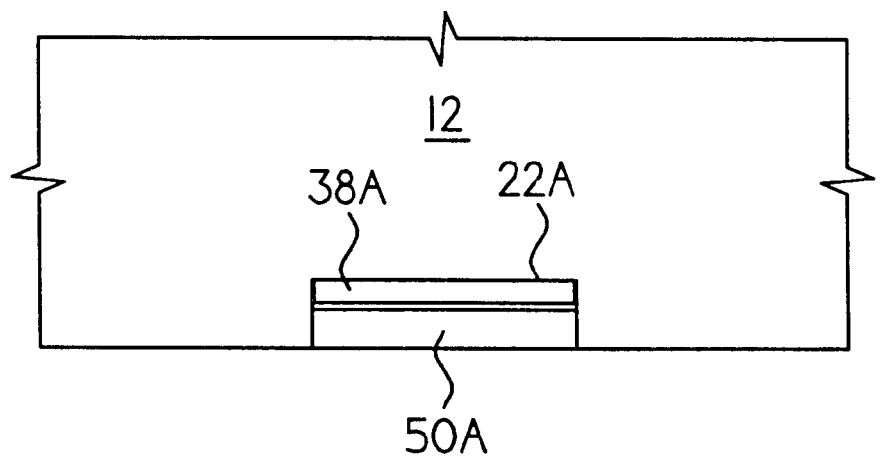
FIG. 2J is a top plan view similar to FIG. 2I taken along lines 2J—2J of FIG. 2G.
Figure 3A:
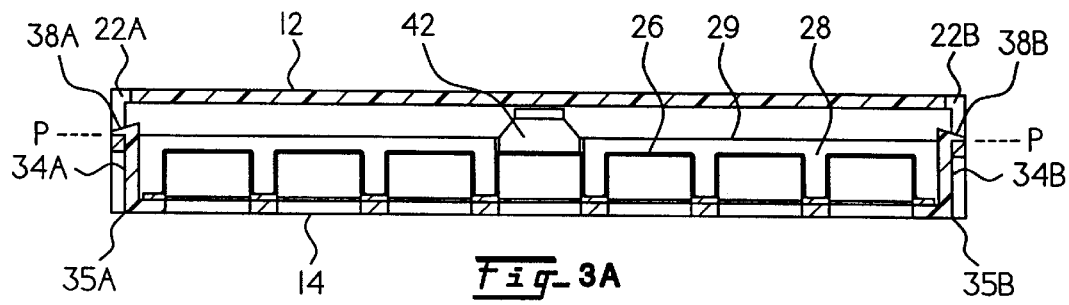
FIG. 3A is a sectional view taken along lines 3A—3A of FIG. 2A.
Figure 3B:
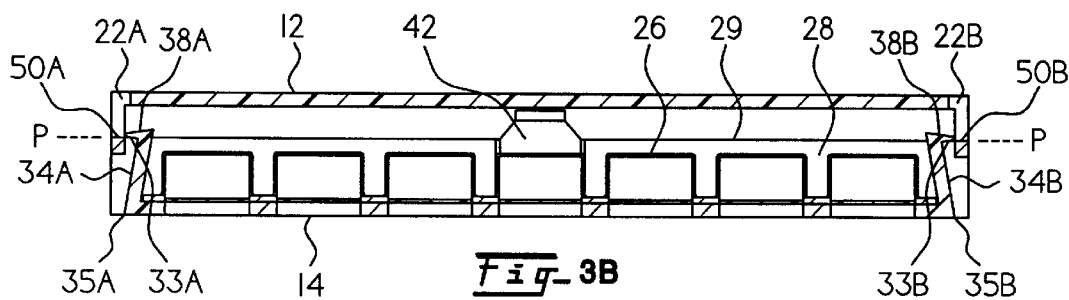
FIG. 3B is a sectional view similar to FIG. 3A taken along lines 3B—3B of FIG. 2C.
Figure 3C:
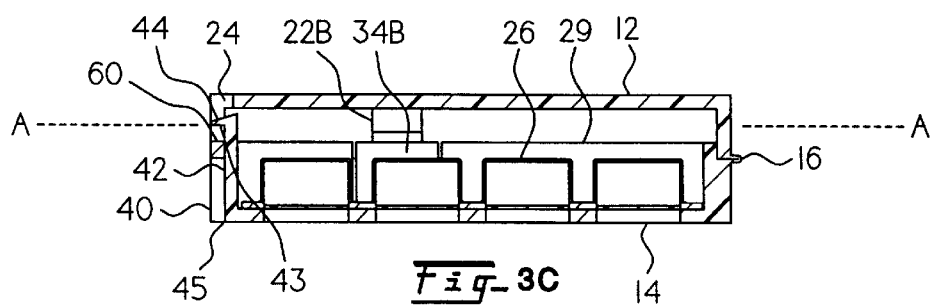
FIG. 3C is a sectional view taken along lines 3C—3C of FIG. 2C.
Figure 3D:
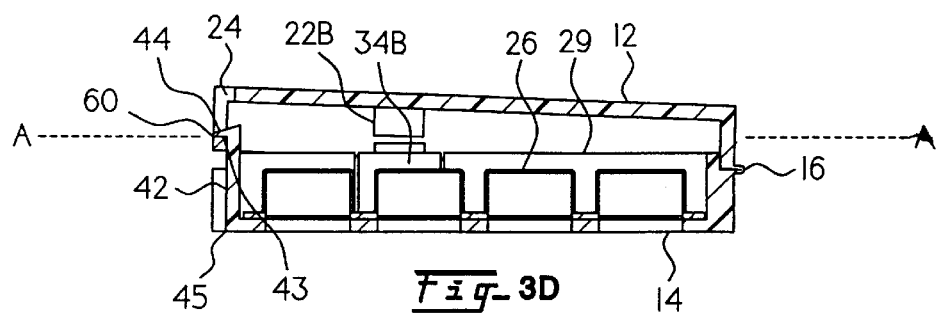
FIG. 3D is a sectional view taken along lines 3D—3D of FIG. 2E.
Figure 3E:
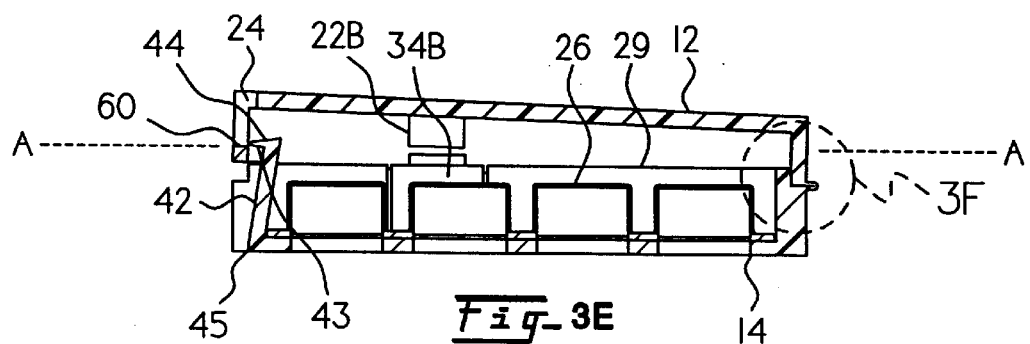
FIG. 3E is a sectional view taken along lines 3E—3E of FIG. 2G.
Figure 3F:
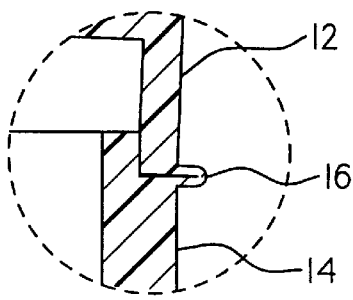
FIG. 3F is a fragmentary sectional view showing the living hinge in broken lines of FIG. 3E.
Figure 3G:
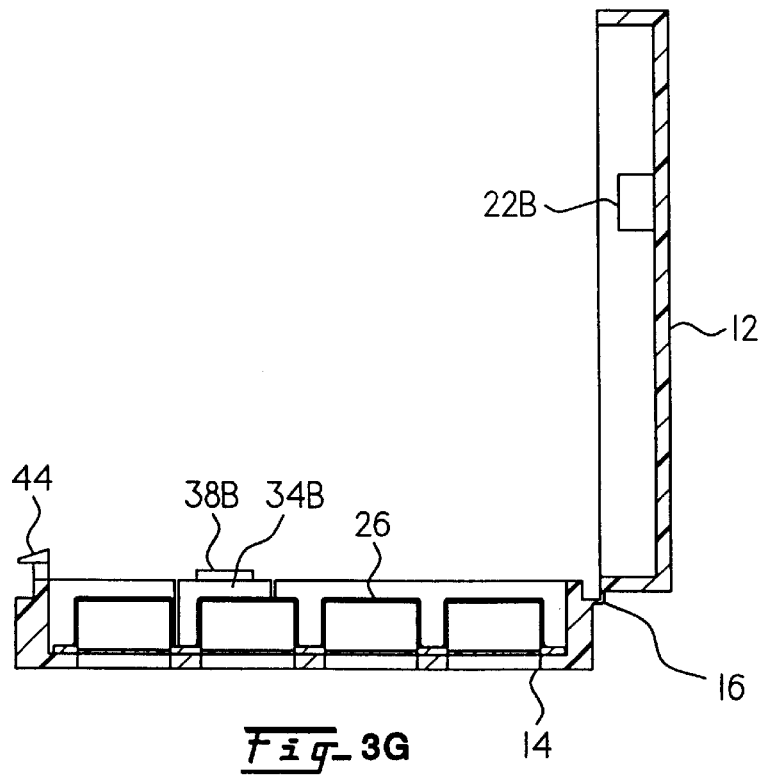
FIG. 3G is a sectional view taken along lines 3G—3G of FIG. 2K.

Consider now opening and closing of a child resistant compact case in accordance with the present invention and assume that this is a new case wherein the case blister packet contains a filled with the medicament and that the case is in a closed position as shown in FIG. 2A. In this position, the side lips (38A and 38B) engage the top edge (50A and 50B) of the slots (22A and 22B) and the front lip (44) of the front lock or latching mechanism (42) is spaced upwardly from its companion edge (60) in the front slot (24). In this position, the top cover (12) nests snugly in the ledge (30). Now, when an adult user desires to open the case to dispense a pill, the side pads (36A and 36B) must be pressed inwardly, simultaneously to the position shown in FIGS. 2C and 2D, which permits the cover (12) to pivot slightly by reason of the inherent flexibility of the living hinge (16) to the position shown in FIG. 2E. In this position, the locking lip (44) of the front pad engages the locking edge of its companion slot (24) preventing the lid from being pivoted to a fully open position. The user then must press in the front pad (46) to release the lip (44) from the locking edge (60) and the living hinge (16) pivots the top (12) to the position shown in FIG. 2K.

Figure 4:
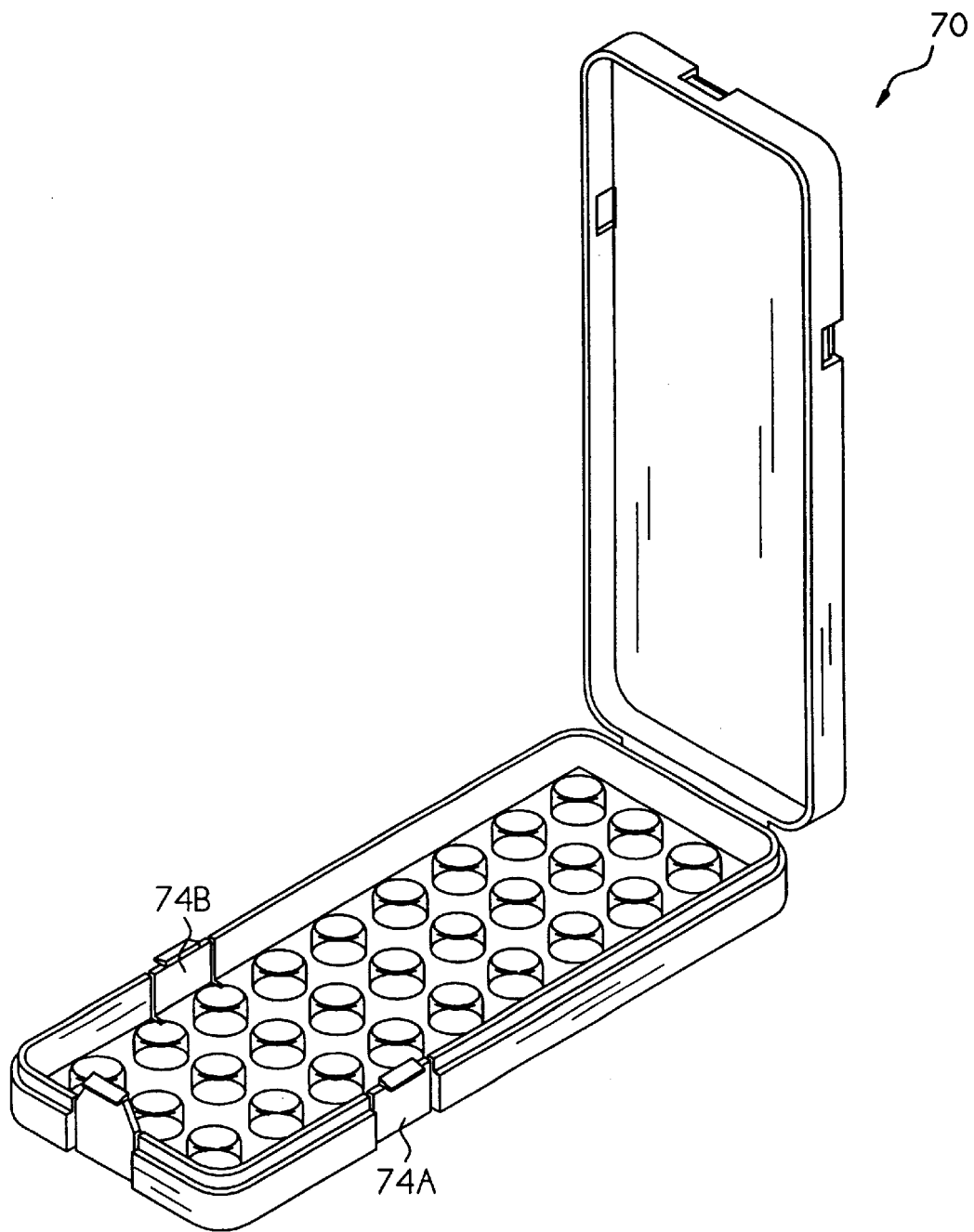
FIG. 4 is a perspective view of a modified case in accordance with the present invention in a fully open position.

FIG. 4 is a modified embodiment of child resistant compact case in accordance with the present invention which likewise operates on the same principles, namely two-side locking or latching mechanisms (74A and 74B) which are configured essentially the same as the two side latches (34A and 34B) of the previously described embodiment and a front locking edge. The geometry of the compact case is somewhat different from that described previously. The case geometry is not limited to a rectangle or square.

Figure 5:
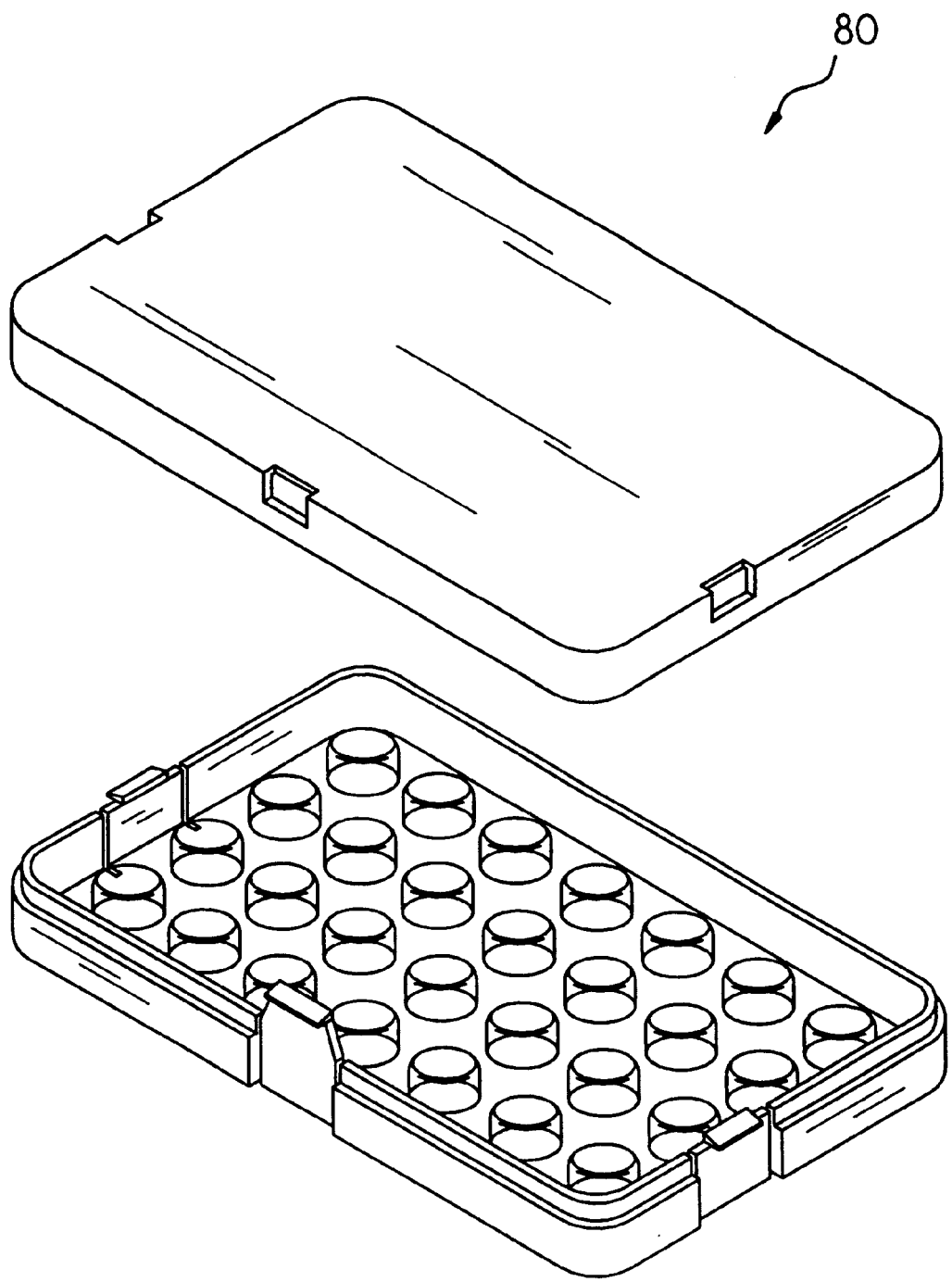
FIG. 5 is a perspective exploded view of still a further modification of a case in accordance with the present invention.

FIG. 5 is another modified form of the invention wherein the cover and base are separate, discreet members and are not connected by a living hinge as in the principal embodiment.

Even though particular embodiments of the present invention have been illustrated and described herein, it is not intended to limit the invention and changes and modifications may be made therein within the scope of the following claims.

What is claimed is:

1. A package for medicaments comprising:
    a cover member and a base member connected along one edge by a living hinge normally biasing the cover to an open position,
    at least one first pivotable latch on one of the members,
    a first opening in the other member having a first edge engageable by said first latch to secure the cover in a closed position,
    a second pivotable latch member on said one member,
    a second opening having a second edge in the other member,
    said second latch spaced from said second edge when the first latch engages said first edge in the closed position,
    pivoting of said first latch to release it from its opening permitting slight pivotable movement of the cover toward an open position until said second latch engages its opening edge whereby said second latch needs to be activated to permit said cover to pivot to a full open position to access the package.

2. A package as claimed in claim 1 wherein the base is of generally rectangular form having a front wall and upstanding side walls and wherein said first latch is provided in each of said side walls and said second latch is located in said front wall of the base.

3. A package for medicaments comprising:

a cover member and a base member connected along one edge by a living hinge normally biasing the cover to an open position, at least one first pivotable latch on one of the members, a first opening in the other member having a first edge engageable by said first latch to secure the cover in a closed position, a second pivotable latch on said one member, a second opening having a second edge in the other member, said second latch spaced from the second edge in the second opening when the cover is in a closed position, pivoting of said first latch to release it from its opening permitting slight pivotable movement of the cover toward an open position until said second latch engages its opening edge, said first latch including a first lip which lies in a predetermined first plane which also includes the top edge of the base when the cover is in a closed position and wherein said second latch includes a second lip which lies in a second predetermined plane spaced upwardly from said first plane.

* * * * *